(12) United States Patent
Cha et al.

(10) Patent No.: US 8,401,053 B2
(45) Date of Patent: Mar. 19, 2013

(54) ACTIVE RFID APPARATUS FOR IMPROVING PN CODE GENERATION

(75) Inventors: Jong-sub Cha, Seoul (KR); Seung-il Myong, Daejeon-si (KR); Heyung-sub Lee, Daejeon-si (KR); Sang-hyun Mo, Daejeon-si (KR); Jong-suk Chae, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 743 days.

(21) Appl. No.: 12/562,105

(22) Filed: Sep. 17, 2009

(65) Prior Publication Data

US 2010/0127831 A1 May 27, 2010

(30) Foreign Application Priority Data

Nov. 21, 2008 (KR) .................. 10-2008-0116308

(51) Int. Cl.
*H04B 1/00* (2006.01)
(52) U.S. Cl. ..................................... 375/141
(58) Field of Classification Search .................. 708/252, 708/251, 250, 422; 375/240.2, 377, 140
See application file for complete search history.

(56) References Cited

U.S. PATENT DOCUMENTS 3,946,215 A * 3/1976 May ................. 708/252
5,022,047 A 6/1991 Dixon et al.
7,065,127 B2 6/2006 Keller et al.
7,089,274 B2 8/2006 Smeets
2001/0050580 A1 * 12/2001 O'Toole et al. ............ 327/158

FOREIGN PATENT DOCUMENTS

KR 10-0201798 B1 6/1999
KR 10-2007-0007687 A 1/2007
KR 10-2008-0022236 A 3/2008

OTHER PUBLICATIONS

International Standard, ISO 18185-5, May 2007, ISO.*

* cited by examiner

*Primary Examiner* — Daniel Washburn
*Assistant Examiner* — Wednel Cadeau
(74) *Attorney, Agent, or Firm* — Kile Park Goekjian Reed McManus PLLC (57) ABSTRACT

An active radio frequency identification (RFID) apparatus having an additional transmitter in addition to a single transmitter is provided. The active RFID apparatus includes a first transmitter including a first pseudo noise (PN) code generator to generate a direct sequence spread spectrum (DSSS) introduced by ISO/IEC (International Organization for Standardization/International Electrotechnical Commission) 24730-2 or ISO/IEC 18185-5 type B; and a second transmitter including a second PN code generator to perform an AND operation on an initial value and a fed back value and shift the resultant value of the AND operation, to perform an XOR operation on particular bits from among the shifted bits and to perform an XOR operation again on the shifted bits and the resulting value of the XOR operation to finally generate a PN code. Accordingly, where an additional PN code is added besides an existing PN code, a PN code having excellent auto correlation characteristics allowing discrimination of the PN code itself and cross-correlation characteristics providing a code discrimination ability with respect to another code can be generated.

12 Claims, 9 Drawing Sheets

ACTIVE RFID APPARATUS FOR IMPROVING PN CODE GENERATION

CROSS REFERENCE TO RELATED APPLICATION

This application claims the benefit under 35 U.S.C. §119 (a) of Korean Patent Application No. 10-2008-0116308, filed on Nov. 21, 2008, the disclosure of which is incorporated herein in its entirety by reference.

BACKGROUND

1. Field

The following description relates to an active radio frequency identification (RFID) system, and more particularly, to a pseudo noise (PN) code generator according to International Standardization Organization/International Electrotechnical Commission (ISO/IEC) 24370-2 or 18185-5 type B.

2. Description of the Related Art

A radio frequency identification (RFID) system includes a reader, an antenna, and a tag and can be employed to recognize a person, a vehicle, a product, a transport card, and the like without touching the item to be recognized. REID systems can be categorized into active and passive types according to the presence of a signal oscillator in a tag. However, the categorization is generally based on whether a power supply, usually a battery, is present in a tag; with the active type requiring a battery and the passive type not requiring a battery. The active type RFID tag enables long-distance communication over several tens of meters.

A pseudo noise (PN) code generator is implemented in an RFID tag and an RFID reader. In a case where an additional transmitter is operated in order to achieve better performance, for example, to improve time synchronization, an additional PN code generator is required for the transmitter in addition to an existing PN code generator. In this case, a technical solution for generating a PN code having superior cross-correlation characteristic as well as a good autocorrelation characteristic is required.

SUMMARY

Accordingly, in one aspect, there is provided a method of generating a PN code having both excellent autocorrelation and cross-correlation characteristics when an additional code is provided besides an original PN code, thereby allowing identification of the original PN code using the autocorrelation characteristics and providing a code discrimination ability with respect to the other code.

In one general aspect, there is provided an active RFID apparatus including an existing PN code generator and an additional PN code generator. The additional PN code generator includes an adding portion to perform an AND operation on an initial value and a fed-back value for generating a PN code; a bit shifting portion to shift bits output from the adding portion; a first XOR operation portion to perform an XOR operation on particular bits from among the bits output from the bit shifting portion; and a second XOR operation portion to perform an XOR operation on the bits output from the bit shifting portion and the resultant bits output from the first XOR operation portion.

The initial value used by the existing PN code generator may be one of 0x1D9, 0x115, 0x11F, 0x123, 0x131, 0x171, and 0x1B5.

The existing PN code generator may include a first adding portion to add up an initial value and a fed-back value for generating a PN code; a bit shifting portion to shift a bit output from the first adding portion; a second adding portion to perform an AND operation on particular bits from among bits output from the bit shifting portion; and an XOR operation portion to perform an XOR operation on at least one of the bits output from the bit shifting portion and the resultant bits output from the second adding portion.

The existing PN code generator may include an adding portion to perform an AND operation on an initial value and a fed-back value for generating a PN code; a bit shifting portion to shift bits output from the adding portion; a first XOR operation portion to perform an XOR operation on particular bits from among the bits output from the bit shifting portion; and a second XOR operation portion to perform an XOR operation on at least one of the bits output from the bit shifting portion and the resultant bits output from the XOR operation portion.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
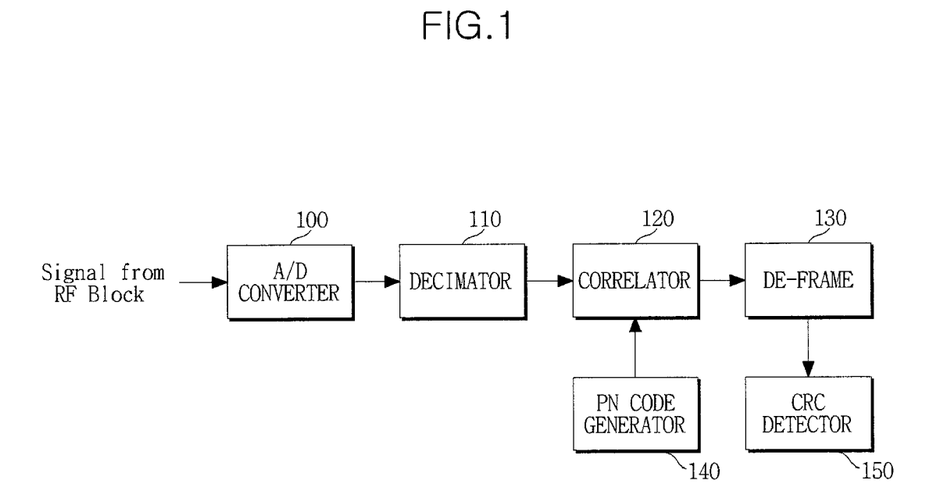
FIG. 1 is a block diagram illustrating a general pseudo noise (PN) generator in a tag/reader for explaining a conventional direct sequence spread spectrum (DSSS).

FIG. 1 is a block diagram illustrating a general pseudo noise (PN) generator in a tag/reader for explaining a conventional direct sequence spread spectrum (DSSS).

As shown in FIG. 1, the PN code generator includes an analog-digital (AID) converter 100, a decimator 110, a correlator 120, a de-framer 130, a PN code generator 140, and a cyclic redundancy check (CRC) detector 150. The A/D converter 100 receives an analog signal output from a radio frequency terminal, and converts the signal into a digital signal. The decimator 110 performs decimation on the converted digital signal, and outputs the decimated digital signal to the correlator 120. The correlator 120 obtains a correlation value of the decimated digital signal by use of a PN code generated by the PN code generator 140. When the correlation value is greater than a predetermined threshold, it is determined that the signal is to be received, and a PN code included in the signal is removed by dispreading to demodulate the signal and to thereby restore the signal to the original state. The de-framer 130 performs the demodulation of the signal to restore the signal to the original state, and the CRC detector 150 determines whether or not the demodulated signal is normal. One essential factor in modulation/demodulation of a DSSS signal is a PN code necessary for spreading and dispreading. Processing gain and interference-coping ability vary with the type of codes used. Thus, a code with better correlation characteristics may be used.

Figure 2:
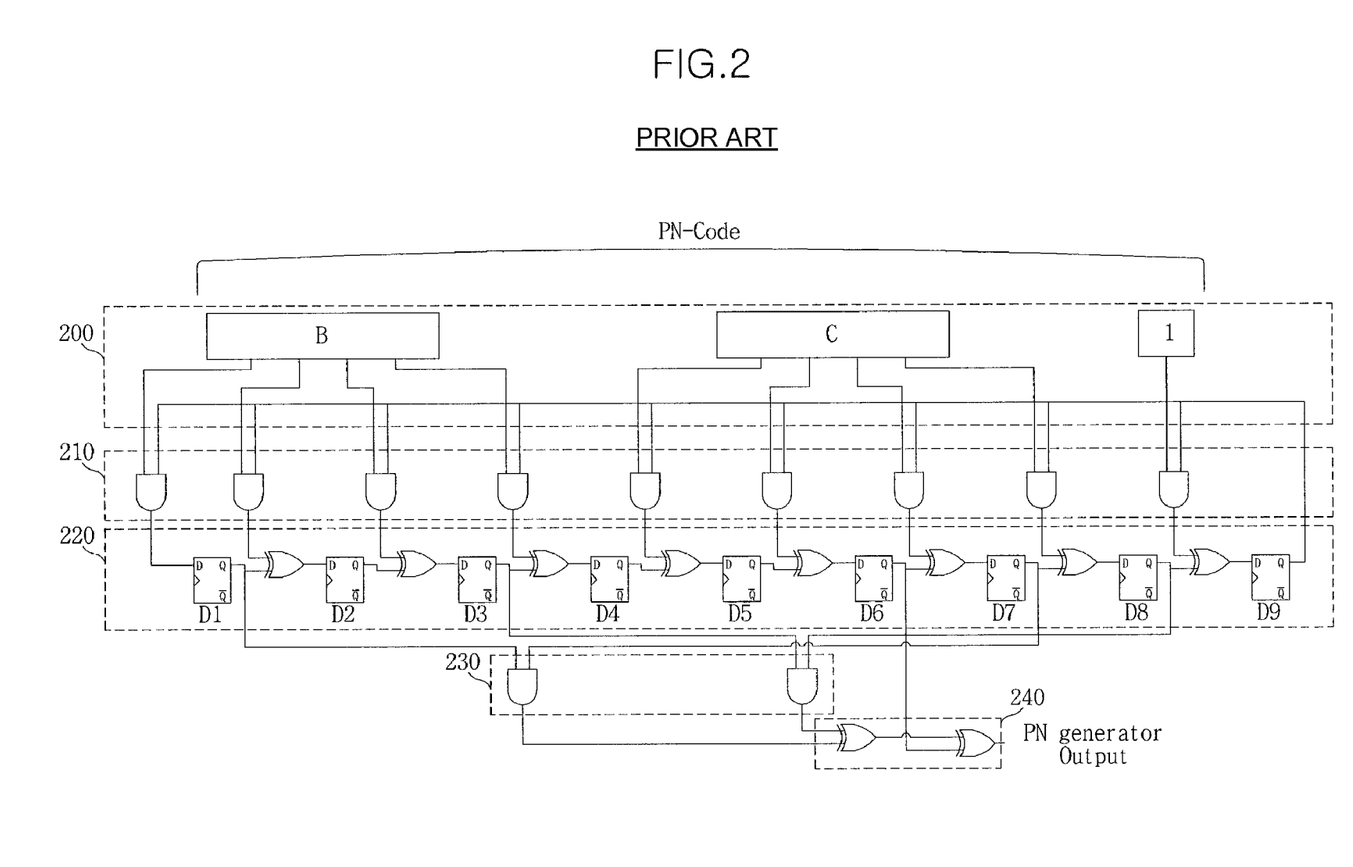
FIG. 2 is a circuit diagram illustrating a configuration of a PN code generator introduced by ISO/IEC 24370-2 or 18185-5 type B for generating DSSS.

FIG. 2 is a circuit diagram illustrating a configuration of a PN code generator introduced by ISO/IEC 24370-2 or 18185-5 type B for generating DSSS.

Figure 5:
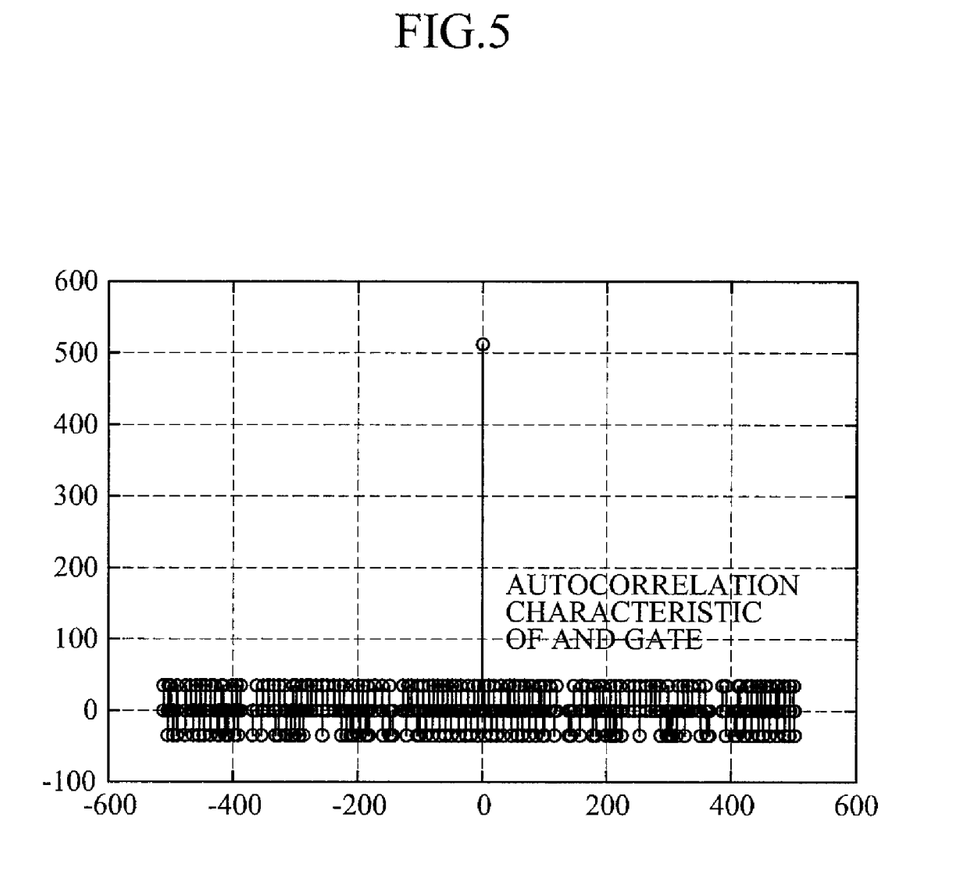
FIG. 5 is a graph illustrating autocorrelation characteristic of the PN code generator of FIG. 2.

The PN code generator includes a portion 200 indicating an initial value for generating a code, a first adding portion 210 to perform an AND operation on the initial value and a fed-back value, a bit shifting portion 220 to shift a bit, a second adding portion 230 to perform an AND operation on specific bits, and an XOR operation portion 240 to perform an XOR operation on specific bits. Correlation characteristics of a PN code with a length of 511 segments is illustrated in FIG. 5. At a point where codes are matched, the maximum value, i.e., 511 can be obtained as a correlation value, but in the other cases, a consistent correlation value (approximately between −33 and +31) is obtained, and thus code discrimination ability is relatively weak.

Generally, a code with good code discrimination has the maximum value, which corresponds to the length of the code, as a correlation value when the code completely matches with a reference code, and otherwise, has a value close to 0. Such a code which completely matches with a reference code has excellent correlation characteristics and thus makes it more likely for its original code to be obtained through demodulation. A code with a length of 511 segments obtained by the PN code generator of FIG. 2 may have several sections comprising 31 segments which are identical with the segments of other codes, and thus the possibility of interference on other signals increases. Consequently, it is difficult to obtain an original code through demodulation.

Figure 3:
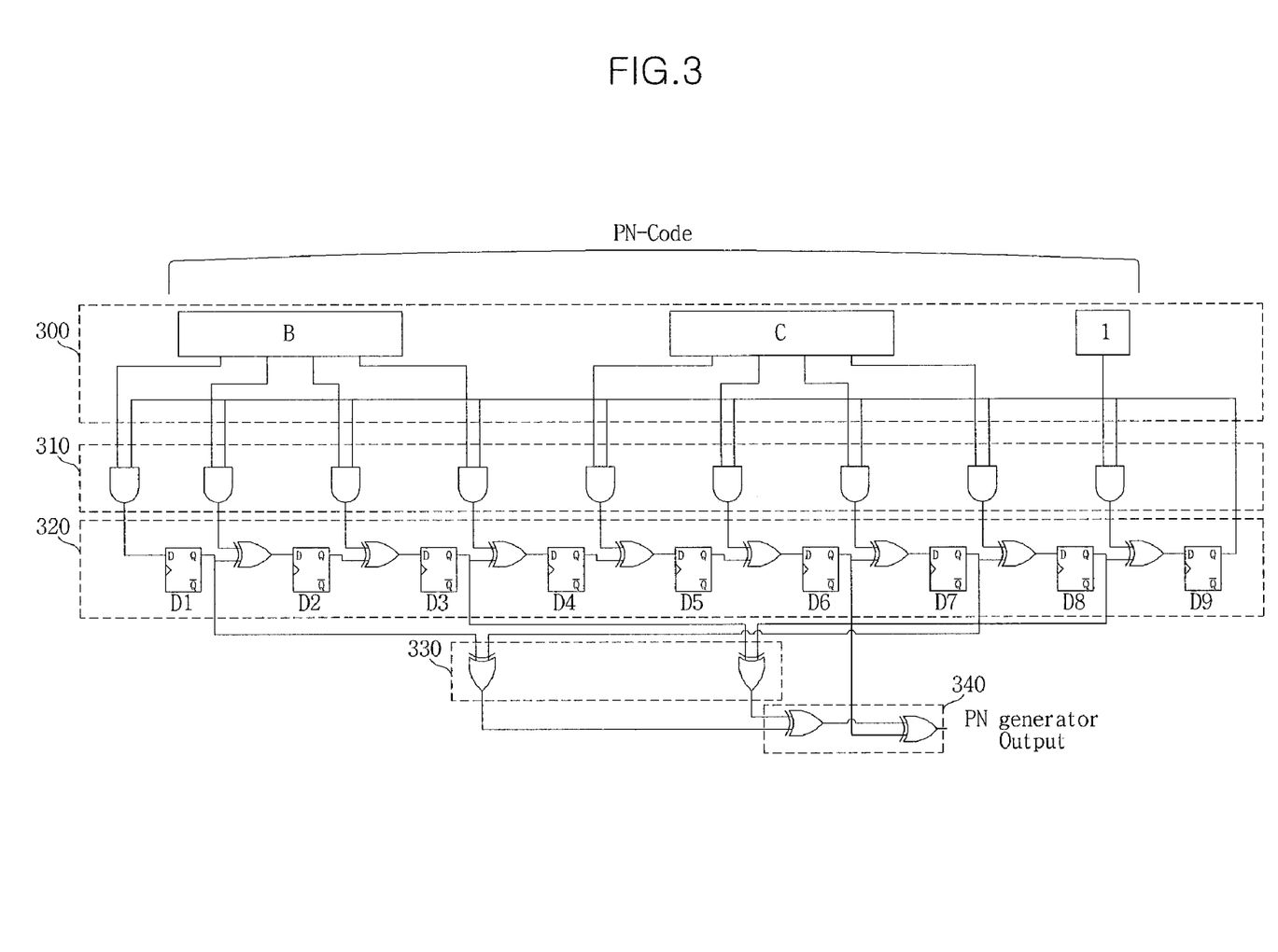
FIG. 3 is a circuit diagram illustrating an improved PN code generator for an active RFID tag and an RFID reader according to an exemplary embodiment.
Figure 6:
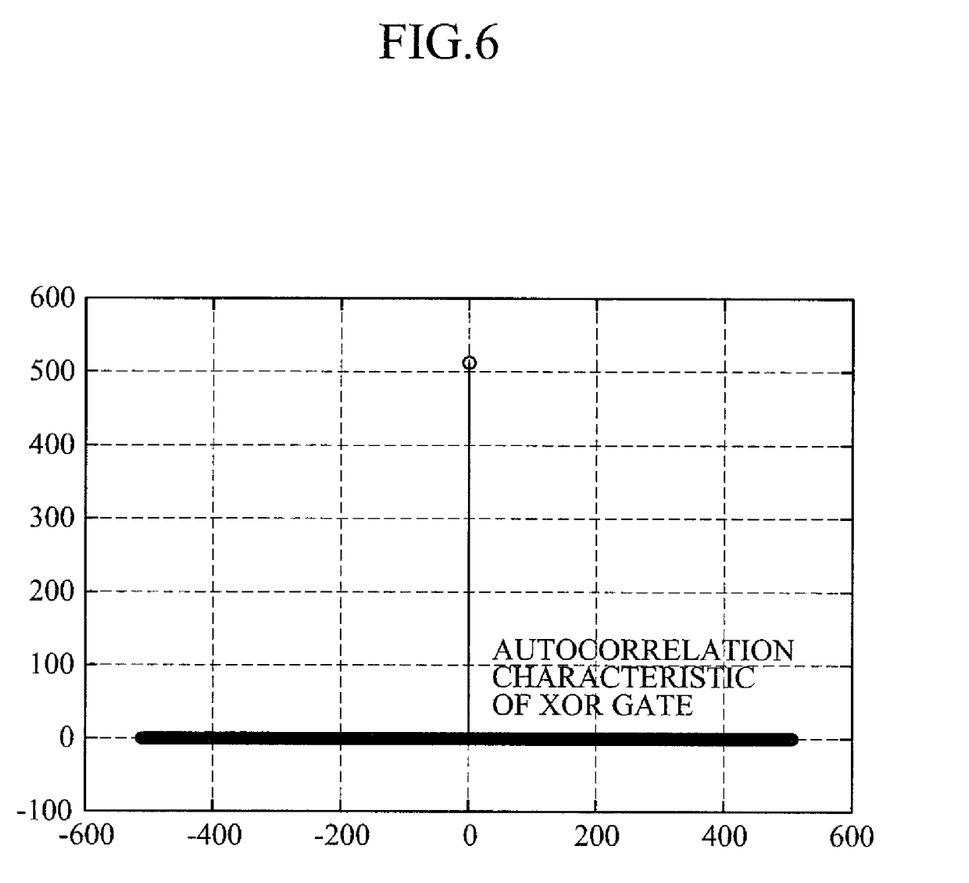
FIG. 6 is a graph illustrating autocorrelation characteristic of the PN code generator of FIG. 3.

FIG. 3 is a circuit diagram illustrating an improved PN code generator for an active RFID tag and an RFID reader according to an exemplary embodiment. The PN code generator includes a portion 300 indicating an initial value for generating a code, an adding portion 310 to perform an ADD operation on the initial value and fed-back values, a bit shifting portion 320 including a plurality of bit shifters to shift bits, a first XOR operation portion 330 to perform an XOR operation on specific bits, and a second XOR operation portion 340 to perform an XOR operation on specific bits. Autocorrelation characteristics of the PN code generator are shown in FIG. 6. As shown in FIG. 6, code discrimination of the current PN code generator is more enhanced than the PN code generator of FIG. 5. Both FIGS. 2 and 3 illustrate PN code generators with good autocorrelation characteristics in a case of a single transmitter.

On the other hand, when an additional transmitter is provided in a system for better performance, cross-correlation characteristics should be good as well as autocorrelation characteristics. However, it is difficult to find a PN code having both good autocorrelation and cross-correlation characteristics.

Figure 4:
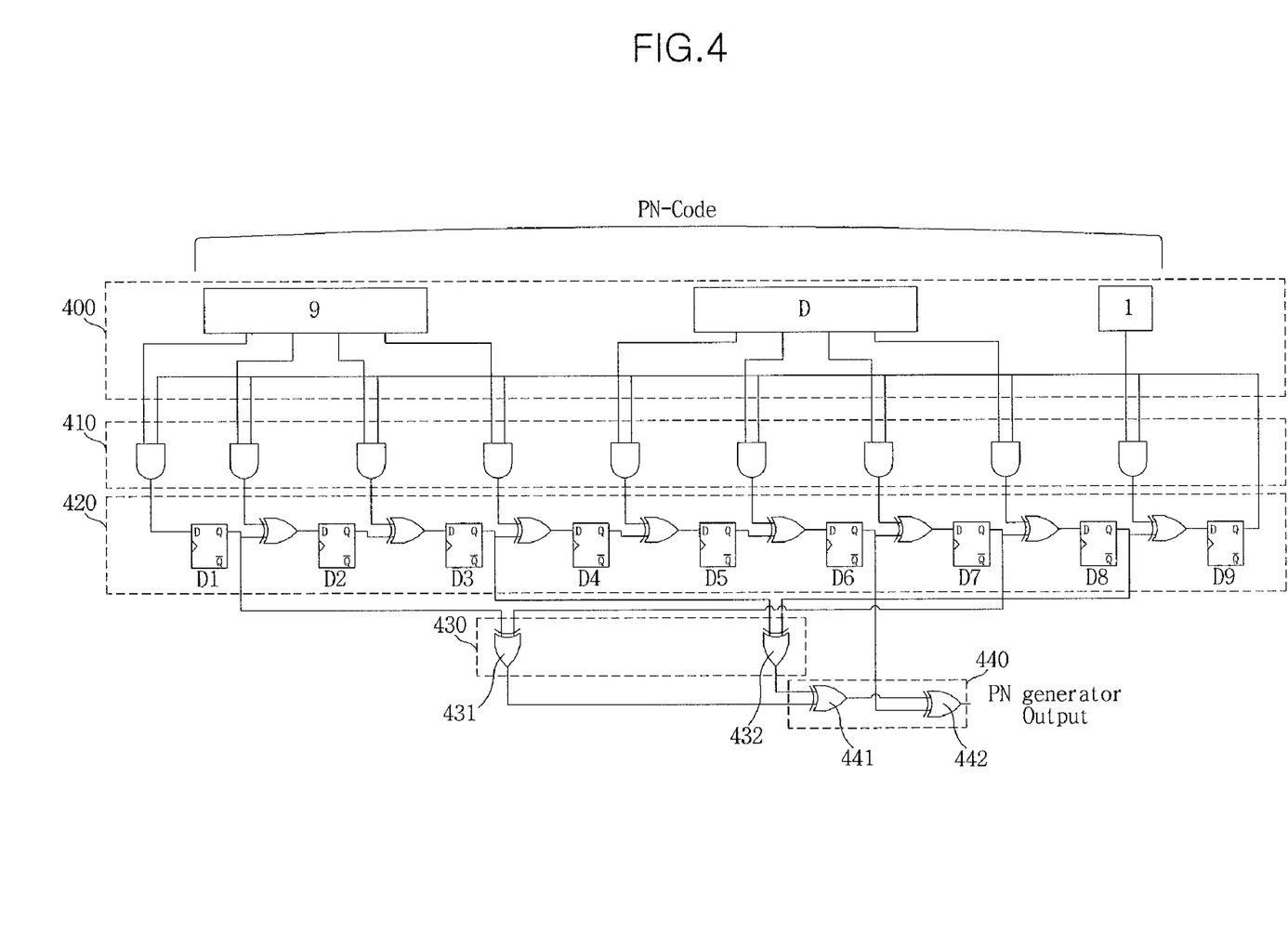
FIG. 4 is a circuit diagram of a PN code generator according to an exemplary embodiment.

According to an exemplary embodiment, autocorrelation and cross-correlation characteristics are improved by applying the PN code generator illustrated in FIG. 2 or 3 to an active RFID tag and additionally employing a PN code generator illustrated in FIG. 4 in order to generate another code.

FIG. 4 is a circuit diagram of a PN code generator according to an exemplary embodiment. As shown in FIG. 4, the PN code generator includes a portion 400 indicating an initial value for generating a code, an adding portion 410 to perform an AND operation on the initial value and fed-back values, a bit shifting portion 420 to shift a bit, a first XOR operation portion 430 to perform an XOR operation on specific bits, and a second XOR operation unit 440 to perform an XOR operation on value of specific bits. In FIG. 4, a code which can improve autocorrelation and cross-correlation characteristics is generated by using a different initial value instead of the initial value Ox1CB used in FIG. 3. Besides an initial value shown in FIG. 4, i.e., Ox1D9, there may be other initial values which can improve autocorrelation and cross-correlation characteristics, such as Ox115, Ox11F, Ox123, Ox131, Ox171, Ox1B5, and so on.

The bit shifting portion 420 is composed of flip-flops and XOR operators. The first XOR operation portion 430 includes a first XOR operator 431 and a second operator 432. The first XOR operator 431 receives a bit output from a particular two flip-flops of the bit shifting portion 420, performs an XOR operation on the received bits and outputs the resulting value. In addition, the second XOR operator 432 receives bits output from another two particular flip-flops of the bit shifting portion 420, performs an XOR operation on the received bits and outputs the resulting value. The second XOR operation portion 440 includes a third XOR operator 441 and a fourth XOR operator 442. The third XOR operator 441 receives bits output respectively from the first XOR operator 431 and the second XOR operator 432, performs an XOR operation on the received bits, and outputs the resulting value. The fourth XOR operator 442 receives bits output respectively from a particular flip-flop of the bit shifting portion 420 and the third XOR operator 441, and performs an XOR operation on the received bits to finally generate a PN code.

Figure 7:
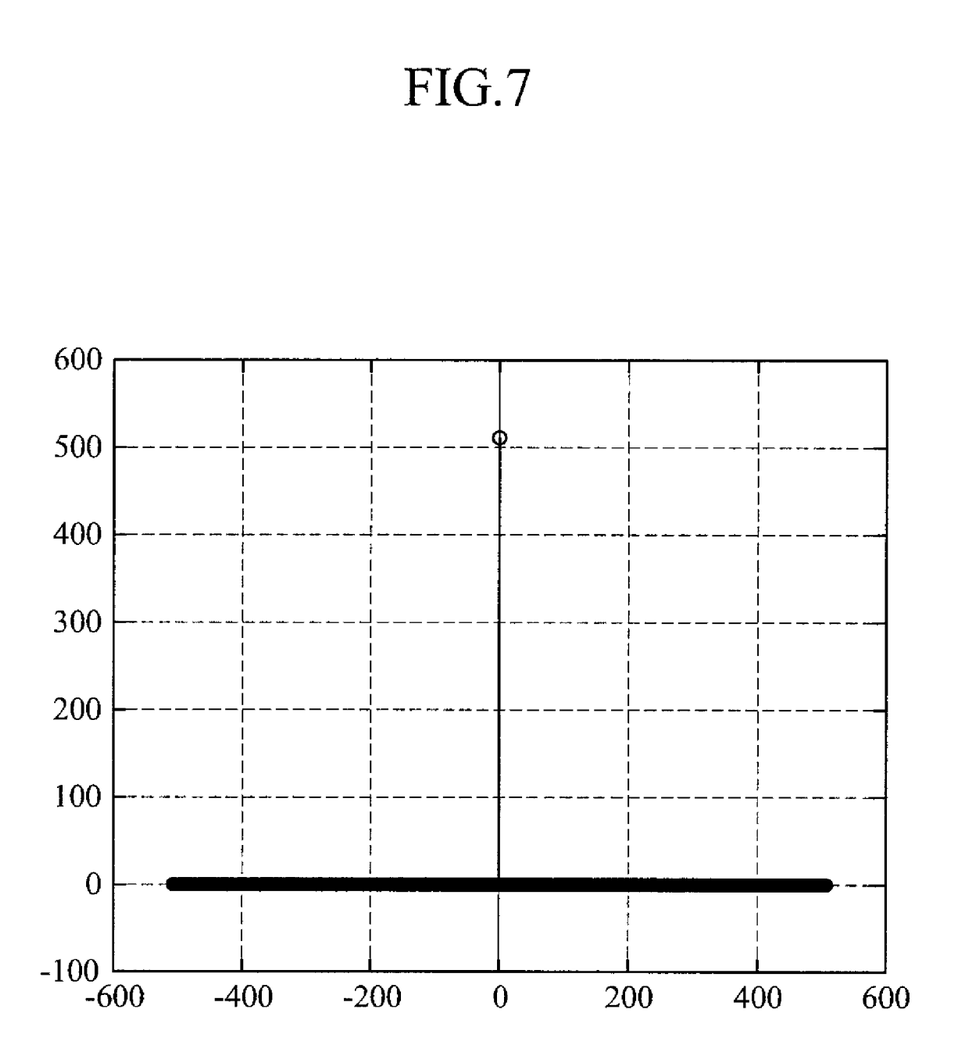
FIG. 7 is a graph illustrating autocorrelation characteristic of the PN code generator of FIG. 4.

The autocorrelation characteristics of the PN code generated by the PN code generator of FIG. 4 are illustrated in FIG. 7. According to the autocorrelation characteristics of the current PN code, the maximum value of 511 can be obtained when the code with a length of 511 completely matches with a reference code, or if even only one section of the code does not match with the reference code, the autocorrelation characteristics have a value of −1. Therefore, improved code discrimination can be achieved.

Figure 8:
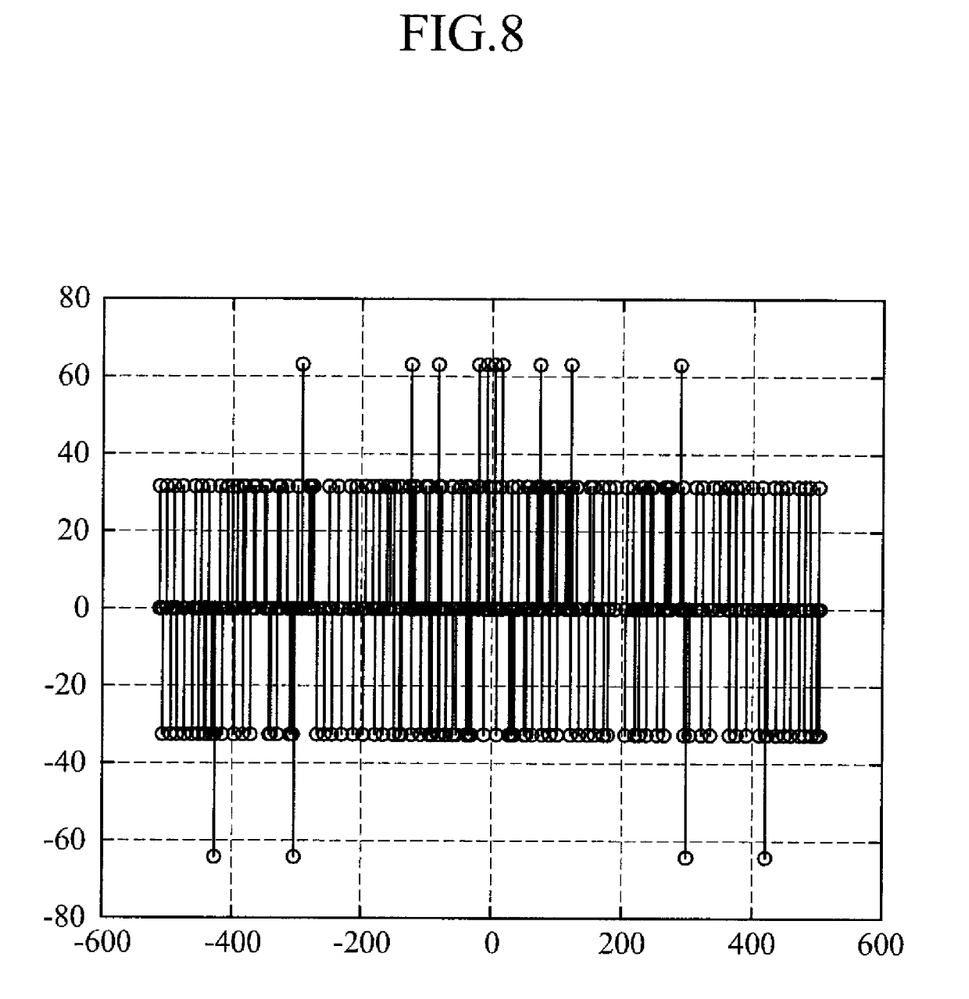
FIG. 8 is a graph illustrating cross-correlation characteristic between the PN code generator of FIG. 4 and the PN code generator of FIG. 2.
Figure 9:
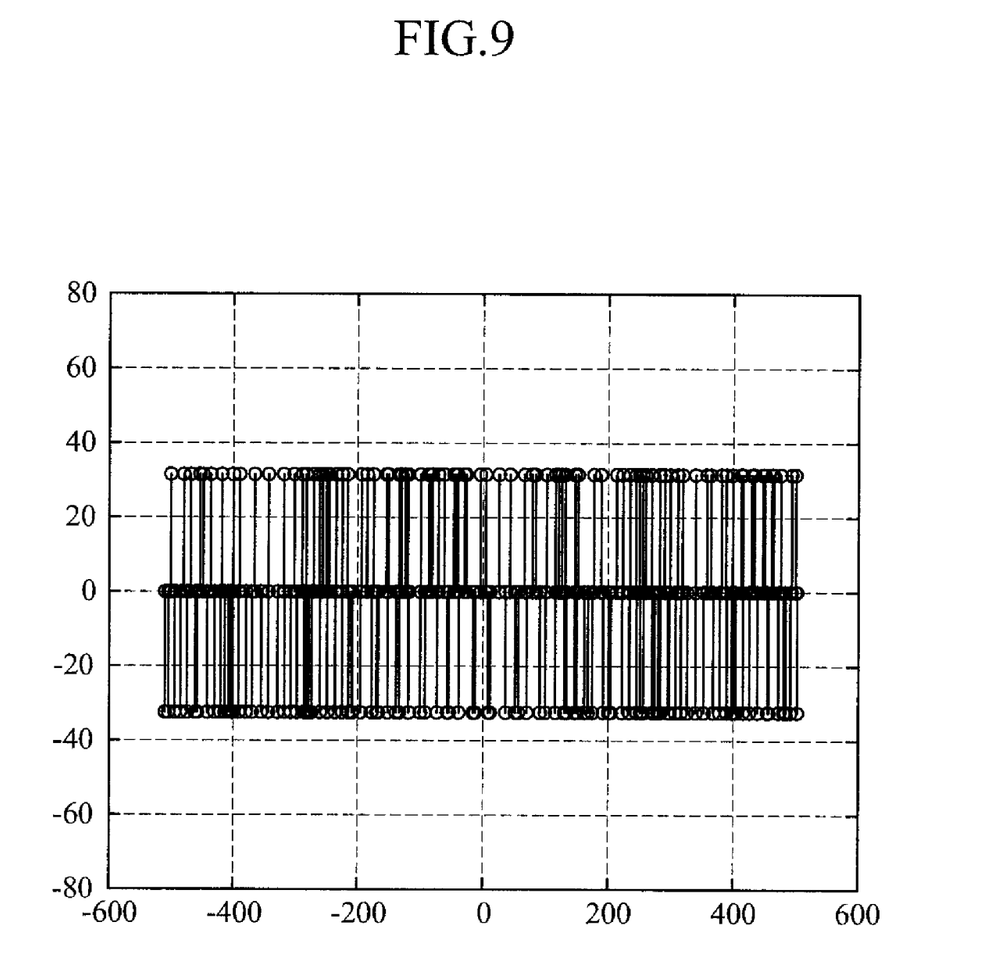
FIG. 9 is a graph illustrating cross-correlation characteristic between the PN code generator of FIG. 4 and the PN code generator of FIG. 3.

Also, cross-correlation characteristics between the PN code illustrated in FIG. 7 and the PN code illustrated in FIG. 5 is illustrated in FIG. 8, and cross-correlation characteristics between the PN code illustrated in FIG. 7 and the PN code illustrated in FIG. 6 are illustrated in FIG. 9. As shown in FIGS. 8 and 9, the PN code illustrated in FIG. 7 has good cross-correlation characteristics with respect to the PN codes illustrated in FIGS. 3 and 4, and therefore can be used to effectively discriminate between different codes. Hence, when PN code generators illustrated in FIGS. 3 and 4 are employed to two different active RFID tags, good autocorrelation and cross-correlation characteristics can be achieved.

As described above, when codes obtained by a PN code generator according to the exemplary embodiment are applied to an RFID transmitter/receiver according to ISO/IEC 24370-2 or 18185-5, autocorrelation and cross-correlation characteristics are improved especially when an additional transmitter is provided in order to achieve better time synchronization. Hence, the code discrimination for a code from the PN code generator and for other codes from an additional PN code generator can be enhanced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An active radio frequency identification (RFID) apparatus comprising:
  a first transmitter including a first pseudo noise (PN) code generator to generate a direct sequence spread spectrum (DSSS) introduced by ISO/IEC (International Organization for Standardization/International Electrotechnical Commission) 24730-2 or ISO/IEC 18185-5 type B; and
  a second transmitter including a second PN code generator to perform an AND operation on an initial value and a fed back value and shift the resultant value of the AND operation, to perform an XOR operation on particular bits from among the shifted bits and to perform an XOR operation again on the shifted bits and the resulting value of the XOR operation to finally generate a PN code.

2. The active RFID apparatus of claim 1, wherein the initial value is one of Ox1D9, Ox115, Ox11F, Ox123, Ox131, Ox171, and Ox1B5.

3. An active radio frequency identification (RFID) apparatus comprising an existing pseudo noise (PN) code generator and an additional PN code generator, wherein the additional PN code generator comprises:
  an adding portion to perform an AND operation on an initial value and a fed-back value for generating a PN code;
  a bit shifting portion to shift bits output from the adding portion;
  a first XOR operation portion to perform an XOR operation on particular bits from among the bits output from the bit shifting portion; and
  a second XOR operation portion to perform an XOR operation on the bits output from the bit shifting portion and the resultant bits output from the first XOR operation portion.

4. The active RFID apparatus of claim 3, wherein the initial value is one of Ox1D9, Ox115, Ox11F, Ox123, Ox131, Ox171, and Ox1B5.

5. The active RFID apparatus of claim 4, wherein the first XOR operation portion comprises a first XOR operator and a second XOR operator, each of which performs an XOR operation on two bits output from the bit shifting portion.

6. The active RFID apparatus of claim 5, wherein the second XOR operation portion comprises a third XOR operator to perform an XOR operation on bits respectively output from the first XOR operator and the second XOR operator, and a fourth XOR operator to perform an XOR operation on one of the shifted bits and a bit output from the third XOR operator.

7. The active RFID apparatus of claim 4, wherein the existing PN code generator is a PN code generator to generate a direct sequence spread spectrum (DSSS) introduced by ISO/IEC 24730-2.

8. The active RFID apparatus of claim 4, wherein the existing PN code generator is a PN code generator to generate DSSS introduced by ISO/IEC 18185-type B.

9. The active RFID apparatus of claim 4, wherein the existing PN code generator comprises:
  a first adding portion to add up an initial value and a fed-back value for generating a PN code;
  a bit shifting portion to shift bits output from the first adding portion;
  a second adding portion to perform an AND operation on particular bits from among the bits output from the bit shifting portion; and
  an XOR operation portion to perform an XOR operation on at least one of the bits output from the bit shifting portion and the resultant bits output from the second adding portion.

10. The active RFID apparatus of claim 9, wherein the initial value used by the existing PN code generator is Ox1CB.

11. The active RFID apparatus of claim 4, wherein the existing PN code generator comprises:
  an adding portion to perform an AND operation on an initial value and a fed-back value for generating a PN code;
  a bit shifting portion to shift bits output from the adding portion;
  a first XOR operation portion to perform an XOR operation on particular bits from among the bits output from the bit shifting portion; and
  a second XOR operation portion to perform an XOR operation on at least one of the bits output from the bit shifting portion and the resultant bits output from the XOR operation portion.

12. The active RFID apparatus of claim 11, wherein the initial value used by the existing PN code generator is Ox1CB.

* * * * *